United States Patent
Zhang et al.

(10) Patent No.: US 9,454,234 B2
(45) Date of Patent: Sep. 27, 2016

(54) INSTRUCTION TRIGGERING METHOD AND DEVICE, USER INFORMATION ACQUISITION METHOD AND SYSTEM, TERMINAL, AND SERVER

(71) Applicant: TENCENT TECHNOLOGY (SHENZHEN) COMPANY LIMITED, Shenzhen (CN)

(72) Inventors: Xiaolong Zhang, Shenzhen (CN); Guanchu Wu, Shenzhen (CN); Yongbo Xie, Shenzhen (CN); Lei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 38 days.

(21) Appl. No.: 14/513,377

(22) Filed: Oct. 14, 2014

(65) Prior Publication Data

US 2015/0054737 A1    Feb. 26, 2015

Related U.S. Application Data

(63) Continuation of application No. PCT/CN2013/073757, filed on Apr. 3, 2013.

(30) Foreign Application Priority Data

Apr. 16, 2012 (CN) ............ 2012 1 0109917
May 7, 2012 (CN) ............ 2012 1 0138491

(51) Int. Cl.
*G06F 3/01* (2006.01)
*G06F 3/0346* (2013.01)
(Continued)

(52) U.S. Cl.
CPC ............. *G06F 3/017* (2013.01); *G06F 3/0346* (2013.01); *G06F 3/0488* (2013.01);
(Continued)

(58) Field of Classification Search
CPC .................................................. G06F 3/0486
See application file for complete search history.

(56) References Cited

U.S. PATENT DOCUMENTS

2007/0259685 A1    11/2007   Englblom et al.
2008/0027671 A1 *   1/2008   Sano .................... G06F 3/0346
                                                        702/141

(Continued)

FOREIGN PATENT DOCUMENTS

CN         101540739 A         9/2009
CN         101655769 A         2/2010

(Continued)

OTHER PUBLICATIONS

Supplementary European Search Report from Application No. EP 13 77 7810 dated Oct. 7, 2015.

(Continued)

*Primary Examiner* — Gerald Johnson
(74) *Attorney, Agent, or Firm* — Marshall, Gerstein & Borun LLP

(57) ABSTRACT

The present disclosure provides a method and apparatus for triggering an instruction, methods and systems for obtaining user information, a terminal, and a server. The instruction triggering method includes: detecting a shaking operation of a mobile terminal; and triggering a preset input instruction according to the detected shaking operation. The user information obtaining method includes: when a mobile terminal detects a shaking operation, the mobile terminal sending a user information obtaining request to a server; and the mobile terminal receiving user information of a matching user returned according to the user information by the server. Another user information obtaining method includes: after a server receives a user information obtaining request triggered by a shaking operation of a mobile terminal, obtaining a user who matches the user information obtaining request and sending user information of the matching user to the mobile terminal. The present disclosure improves the convenience of operations and provides a widely used experience of randomly making friends.

22 Claims, 7 Drawing Sheets

(51) Int. Cl.
*H04M 1/725* (2006.01)
*G06F 3/0488* (2013.01)
*H04M 1/67* (2006.01)

(52) U.S. Cl.
CPC . *H04M 1/72519* (2013.01); *G06F 2200/1637* (2013.01); *G06F 2203/04106* (2013.01); *G06F 2203/04808* (2013.01); *H04M 1/67* (2013.01); *H04M 1/72544* (2013.01); *H04M 1/72572* (2013.01); *H04M 2250/12* (2013.01)

(56) References Cited

U.S. PATENT DOCUMENTS

| | | | |
|---|---|---|---|
| 2008/0233996 | A1 | 9/2008 | Ogasawara et al. |
| 2009/0303204 | A1 | 12/2009 | Nasiri et al. |
| 2010/0246571 | A1* | 9/2010 | Geppert .............. G06F 3/04817 370/352 |
| 2011/0028160 | A1 | 2/2011 | Roeding et al. |
| 2011/0117970 | A1 | 5/2011 | Choi |
| 2011/0137548 | A1 | 6/2011 | Shen et al. |
| 2011/0191352 | A1 | 8/2011 | Jones et al. |
| 2011/0310041 | A1 | 12/2011 | Williams et al. |
| 2012/0050009 | A1* | 3/2012 | Hsieh ...................... G06F 21/36 340/5.51 |
| 2012/0276929 | A1 | 11/2012 | Park et al. |
| 2013/0151590 | A1* | 6/2013 | Feng ...................... G06Q 30/02 709/203 |
| 2014/0313151 | A1 | 10/2014 | Kim et al. |

FOREIGN PATENT DOCUMENTS

| | | |
|---|---|---|
| CN | 101770459 A | 7/2010 |
| CN | 101819505 A | 9/2010 |
| CN | 201854336 U | 6/2011 |
| CN | 102281207 A | 12/2011 |
| CN | 102340595 A | 2/2012 |
| CN | 102360360 A | 2/2012 |
| CN | 102629945 A | 8/2012 |
| CN | 102902472 A | 1/2013 |
| JP | 2000-167232 A | 6/2000 |
| JP | 2003-345492 A | 12/2003 |
| JP | 2006-004318 A | 1/2006 |
| JP | 2009-5334 | 1/2009 |
| JP | 2009-188776 A | 8/2009 |
| JP | 2010152477 A | 7/2010 |
| JP | 2011-035855 A | 2/2011 |
| JP | 2011-061495 A | 3/2011 |
| JP | 2012-234510 A | 11/2012 |
| WO | WO-2007/148817 A1 | 12/2007 |

OTHER PUBLICATIONS

Australian Office Action from Application No. 2013248815 dated Aug. 12, 2015.
English Abstract of "Encounter with a Stranger".
International Preliminary Report on Patentability and Written Opinion in International Application No. PCT/CN2013/073757 dated Oct. 21, 2014, 9 pages.
Office Action in CN201210138491.7 dated Aug. 4, 2014, 11 pages.
Office Action in CN201210109917.6 dated Sep. 3, 2013, 9 pages.
Kikier, "Encounter With a Stranger, PC Fan", Dec. 31, 2011, pp. 42-44.
Search Report in Application No. PCT/CN2013/073757 dated Jul. 11, 2013.
Yuan et al., Tencent Micro Revolution:, China Entrepreneur, No. Z1, Jan. 20, 2012, pp. 92-95.
Office Action in JP Application No. 2015-506083 dated Dec. 18, 2015, 4 pages.

* cited by examiner

INSTRUCTION TRIGGERING METHOD AND DEVICE, USER INFORMATION ACQUISITION METHOD AND SYSTEM, TERMINAL, AND SERVER

CROSS-REFERENCE TO RELATED APPLICATIONS

This application is a continuation application of PCT Patent Application No. PCT/CN2013/073757, entitled "Instruction Triggering Method and Device, User Information Acquisition Method and System, Terminal, and Server" filed on Apr. 3, 2013, which claims priority to Chinese Patent Application No. 201210109917.6, filed on Apr. 16, 2012, and Chinese Patent Application No. 201210138491.7, filed on May 7, 2012, which are incorporated by reference in their entirety.

TECHNICAL FIELD

The present disclosure relates to internet technologies, and especially relates to an instruction triggering method and apparatus, user information obtaining methods and systems, a terminal, and a server.

BACKGROUND

In traditional art, a mobile terminal is usually configured with multiple keys. Each key corresponds to a preset input instruction, and a user can trigger an input instruction by pressing a key. When there are so many preset input instructions that the keys are not enough, an input instruction can be triggered by using a key combination. However, for a mobile terminal with a touch screen, e.g., a smart phone, an input instruction can be triggered by obtaining a pressing or sliding operation of the user on a certain area of the touch screen.

However, since generally a mobile terminal is designed to be relatively light and with a relatively small size, and keys configured in an input area thereof usually are relatively small, when a user selects a key to trigger an instruction, he is easy to press a wrong key to cause an input failure, and needs to input it again. While for a mobile terminal with a touch screen, a user needs to first position a virtual key (an icon) on the touch screen with naked eyes and then trigger an instruction by press. Therefore, the methods for triggering an instruction in the traditional art are not convenient enough.

SUMMARY

In view of this, an example of the present disclosure provides an instruction triggering method which can improve the convenience of a user' operation, the method includes: detecting a shaking operation of a mobile terminal; and triggering a preset input instruction according to the detected shaking operation.

An example of the present disclosure provides a user information obtaining method, including: a mobile terminal sending a user information obtaining request to a server when the mobile terminal detects a shaking operation; and the mobile terminal receiving user information of a matching user returned according to the user information by the server.

An example of the present disclosure also provides a user information obtaining method, including: after a server receives a user information obtaining request triggered by a shaking operation of a mobile terminal, obtaining a user who matches the user information obtaining request and sending user information of the matching user to the mobile terminal.

An example of the present disclosure provides an instruction triggering apparatus, including: a detection module, to detect a shaking operation of a mobile terminal; and a triggering module, to trigger a preset input instruction according to the detected shaking operation.

An example of the present disclosure also provides a mobile terminal, including: a detection module, to detect a shaking operation of the mobile terminal; a triggering module, when the detection module detects the shaking operation, to send a user information obtaining request to a server; and a receiving module, to receive user information of a matching user returned according to the user information obtaining request by the server.

An example of the present disclosure provides a server, including: a receiving module, to receive a user information obtaining request triggered by a shaking operation of a mobile terminal; a matching module, to obtain a user who matches the user information obtaining request; and a sending module, to send user information of the matching user to the mobile terminal.

In the above instruction triggering method and apparatus, the input instruction is triggered by detecting the shaking operation of the mobile terminal, so that when a user uses the mobile terminal, he can complete the triggering of the input instruction by shaking the mobile terminal directly, which avoids looking for a specific key on the keyboard of the mobile terminal so as to improve the convenience of the user operation.

In the above user information obtaining method and system, the mobile terminal generates the user information obtaining request and uploads it by detecting the shaking operation; and after the server receives the user information obtaining request, it obtains a user that matches the user information obtaining request, and sends the user to the mobile terminal. Since as long as the shaking operation of the mobile terminal is detected, the matching user can be requested and it is not necessary for the user to input a keyword, the convenience of operation by the user is improved.

By matching the interest information of the terminal and the interest information saved by the server to obtain a matching user and sending the user information of the matching user to the terminal, the present disclosure provides more targeted user information for the terminal user to make friends and provides a widely used experience of randomly making friends.

DETAILED DESCRIPTION

Figure 1:
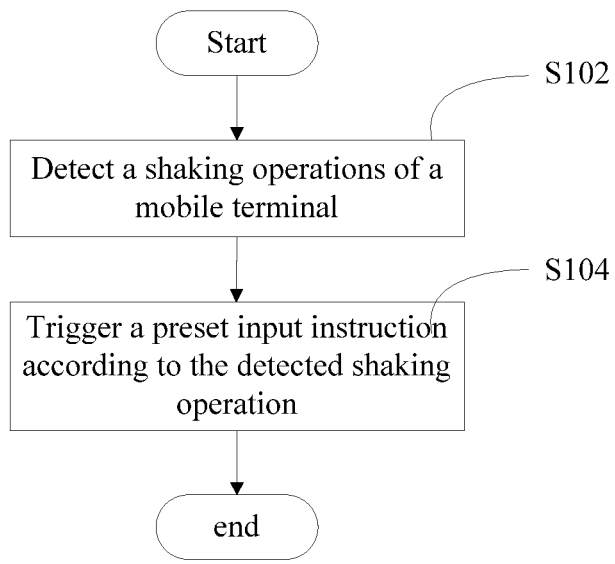
FIG. 1 shows a flow chart of an instruction triggering method according to an example of the present disclosure.

In an example, as shown in FIG. 1, an instruction triggering method includes the following steps.

At block S102, a shaking operation of a mobile terminal is detected.

In an example, the shaking operation of the mobile terminal can be detected by an accelerometer. Accelerometers are a device that detects acceleration and include angular accelerometers and linear accelerometers.

At Block S104, a preset input instruction is triggered according to the detected shaking operation.

In an example, the preset input instruction can be triggered according to a detected shaking amplitude and/or shaking frequency of the mobile terminal. In the present example, the preset input instruction can be triggered when the accelerometer detects that the shaking amplitude and/or the shaking frequency of the mobile terminal is larger than a preset value.

In an example, a step of playing an animation and/or a sound according to the shaking operation may further be included after the step of triggering the preset input instruction according to the detected shaking operation.

For example, when the shaking amplitude and/or the shaking frequency are/is larger than the preset value, the animation and/or the sound will be played.

Whether or not to play the animation and/or the sound is determined according to the shaking amplitude and/or the shaking frequency, and using the multimedia can visually prompt a user whether a current shaking operation can trigger the input instruction so as to facilitate the user to know whether the current shaking operation works or not.

In an example, the preset input instruction can be a screen unlocking instruction.

A step of unlocking a display screen of the mobile terminal according to the preset input instruction may further be included after the step of triggering the preset input instruction according to the detected shaking operation. When the display screen of the mobile terminal is locked for saving energy, the user can unlock the display screen by shaking the mobile terminal instead of looking for an unlock key on the keyboard. Thus, when the user is in a dark environment, it is convenient for him to unlock the display screen.

In an example, the preset input instruction is an incoming call answer/termination instruction.

A step of answering/terminating an incoming call according the preset input instruction may be further included after the step of triggering the preset input instruction according to the detected shaking operation. When a ring rings to prompt that there is an incoming call, the user can answer the incoming call by shaking the mobile terminal; or when the user hopes to end the call, he can hang up the incoming call by shaking the mobile terminal.

In an example, the preset input instruction is a data sending instruction.

A step of sending data to a server according to the preset input instruction may be further included after the step of triggering the preset input instruction according to the detected shaking operation.

Figure 2:
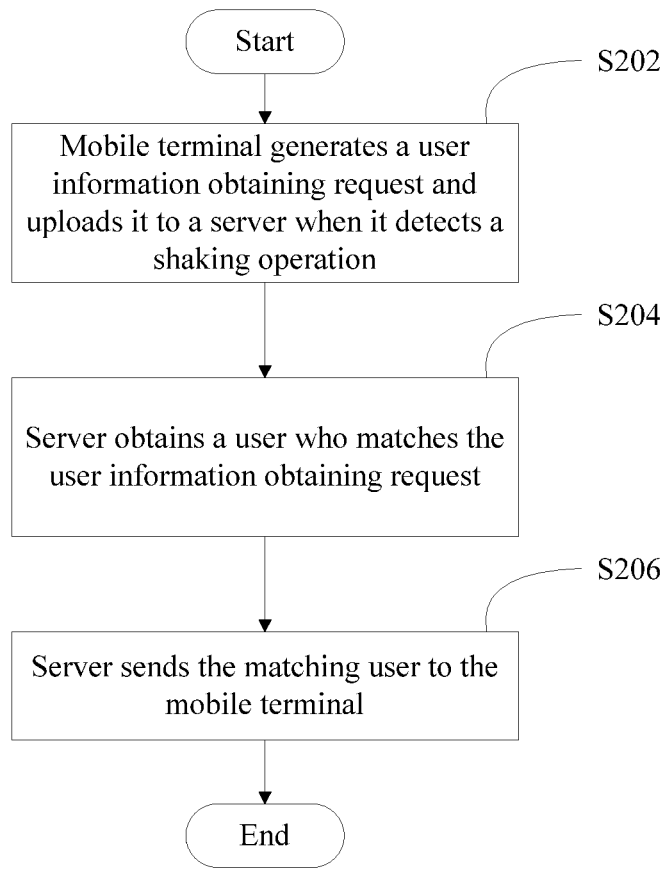
FIG. 2 shows a flow chart of a user information obtaining method according to an example of the present disclosure.

In an example, as shown in FIG. 2, a user information obtaining method includes the following steps.

At block S202, the mobile terminal generates a user information obtaining request and uploads it to the server when it detects the shaking operation.

In an example, the mobile terminal can detect the shaking operation of the mobile terminal by using an accelerometer. Accelerometers are a device that detects acceleration and include angular accelerometers and linear accelerometers. The user information obtaining request is a request that contains preset personal information of the user and a matching keyword preset by the user. In an example, the mobile terminal can generate the user information obtaining request according to the detected shaking amplitude and/or the shaking frequency of the mobile terminal. In the present example, the mobile terminal can generate the user information obtaining request and unload it to the server when it detects, via the accelerometer, that the shaking amplitude and/or the shaking frequency of the mobile terminal are/is larger than the preset value.

Further, the mobile terminal may also play an animation and/or a sound according to the shaking operation before the step of generating the user information obtaining request and uploading it to the server. For example, when the shaking amplitude and/or the shaking frequency are/is larger than the preset value, the animation and/or the sound are/is played.

Whether or not to play the animation and/or the sound is determined according to the shaking amplitude and/or the shaking frequency, and using the multimedia can visually prompt the user whether a current shaking operation triggers the user information obtaining request so as to facilitate the user to know whether the current shaking operation works or not.

At block S204, the server obtains a user who matches the user information obtaining request.

Preset personal information of a user can be stored in the mobile terminal and the user information obtaining request generated in block S202 can contain the personal information. After the server receives the user information obtaining request, it can extract the personal information from the user information obtaining request and obtain a matching user according to the personal information.

For example, the personal information of user A can include gender and a location. Then the server can obtain an opposite sex whose location is near to user A and the time is the same with user A as the matching user.

At block S206, the server sends the matching user to the mobile terminal.

In an example, the server can obtain user information of the matching user and send the user information of the matching user to the mobile terminal. The user information can be preset by the user, including at least one of name, avatar, gender, region, and personalized signature.

In the present example, after the mobile terminal receives the sent matching user, it may also show the matching user. And when there are multiple matching users, the mobile terminal can show the matching users in a list. Each matching user occupies a column of the list and an avatar of the matching user and a distance to the matching user can be shown in the column.

In another example, geographical location information of the mobile terminal can be obtained at block S202, and the user information obtaining request is generated and uploaded according to the geographical location information. That is, the generated user information obtaining request contains the geographical location information submitted by the mobile terminal.

In the present example, the server extracts the geographical location information in the user information obtaining request, calculates a distance between the mobile terminal and the matching user according to the geographical location information and sends the distance between the mobile terminal and the matching user to the mobile terminal.

The mobile terminal can obtain its geographical location information by a positioning service of the LBS (Location Based Service). In the present example, the mobile terminal can obtain its longitude and latitude information (the geographical location information) via a GPS device. In another example, the mobile terminal can upload an identification of a base station or a broadband access point where it locates to the LBS system and obtain its geographical location information via a feedback from the LBS system.

In the current example, the server can extract respective geographical location information from user information obtaining requests uploaded by multiple matching users, change it to longitude and latitude information, and calculate the distances between the mobile terminal and the matching users according to the longitude and latitude information. The calculated distances are physical distances between the mobile terminal and the matching users, for example, 1000 m, 200 km, etc.

Further, in an example, specifically, the step of the server obtaining the user who matches the user information obtaining request can be: the server obtaining a user whose distance is smaller than or equal to a first threshold as the matching user.

In another example, specifically, the step of the server obtaining the user who matches the user information obtaining request can be: the server obtaining a user a time difference between whose request time and a request time submitted by the mobile terminal is smaller than or equal to a second threshold as the matching user.

For example, if the request time when the user information obtaining request uploaded by user A is received is 10:33:10 and the second threshold is 10 seconds, then the server obtains users corresponding to other user information obtaining requests whose request time is between 10:33:00 and 10:33:20 as the matching users. That is, other users who shake their mobile terminals when user A shakes his mobile terminal are obtained as the matching users.

Figure 3:
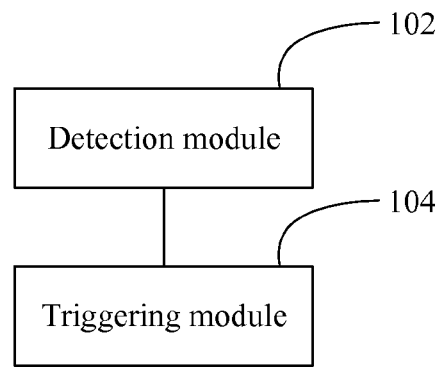
FIG. 3 shows a structural schematic diagram of an instruction triggering apparatus according to an example of the present disclosure.

In an example, as shown in FIG. 3, an instruction triggering apparatus includes a detection module 102 to detect a shaking operation of a mobile terminal.

In an example, the detection module 102 can be used to detect the shaking operation of the mobile terminal by using an accelerometer. Accelerometers are a device that detects acceleration and include angular accelerometers and linear accelerometers.

A triggering module 104 is adapted to trigger a preset input instruction according to the detected shaking operation.

In an example, the triggering module 104 can be used to trigger the preset input instruction according to a detected shaking amplitude and/or shaking frequency of the mobile terminal. In the present example, the triggering module 104 can be used to trigger the preset input instruction when the accelerometer detects that the shaking amplitude and/or the shaking frequency of the mobile terminal are/is larger than a preset value.

Figure 4:
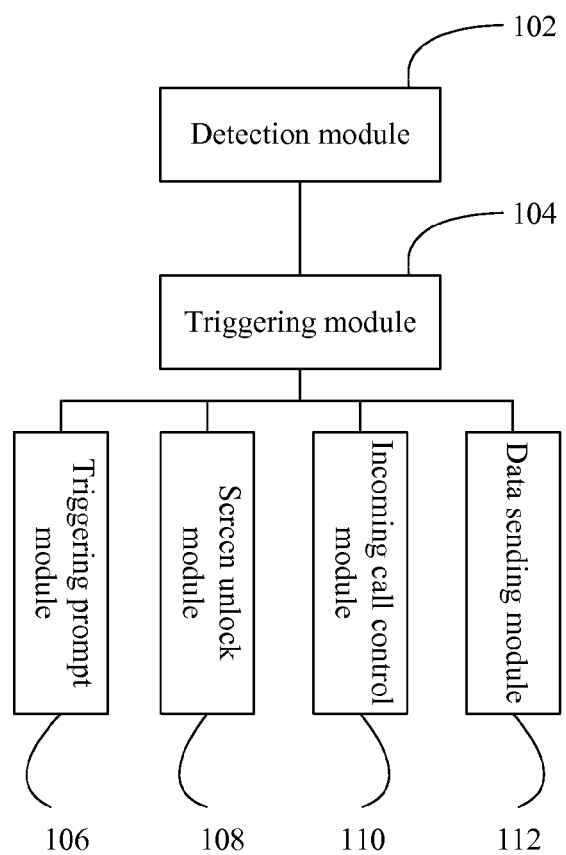
FIG. 4 shows a structural schematic diagram of an instruction triggering apparatus according to another example of the present disclosure.

In an example, as shown in FIG. 4, the instruction triggering apparatus also includes a triggering prompt module 106 to play an animation and/or a sound according to the shaking operation.

For example, the triggering prompt module 106 may be used to play the animation and/or the sound when the shaking amplitude and/or the shaking frequency are/is larger than the preset value.

Whether or not to play the animation and/or the sound is determined according to the magnitude of the shaking amplitude and/or shaking frequency and using the multimedia can visually prompt a user whether a current shaking operation can trigger the input instruction so as to facilitate the user to know whether the current shaking operation works or not.

In an example, the preset input instruction can be a screen unlocking instruction, and as shown in FIG. 4, the instruction triggering system also includes a screen unlocking module 108 to unlock a display screen of the mobile terminal according to the preset input instruction. When the display screen of the mobile terminal is locked for saving energy, the user can unlock the display screen by shaking the mobile terminal instead of looking for an unlock key on the keyboard. Thus when the user is in a dark environment, it is convenient for him to unlock the display screen.

In an example, the preset input instruction is an incoming call answer/termination instruction, and as shown in FIG. 4, the instruction triggering system also includes an incoming call control module 110, to answer/terminate an incoming call according to the preset input instruction. When a ring rings to prompt that there is an incoming call, the user can answer the incoming call by shaking the mobile terminal; or when the user hopes to end the call, he can hang up the incoming call by shaking the mobile terminal.

In an example, the preset input instruction is a data sending instruction. And as shown in FIG. 4, the instruction triggering system also includes a data sending module 112, which can send data to a server according to the preset input instruction.

The above instruction triggering apparatus is applicable to the mobile terminal.

Figure 5:
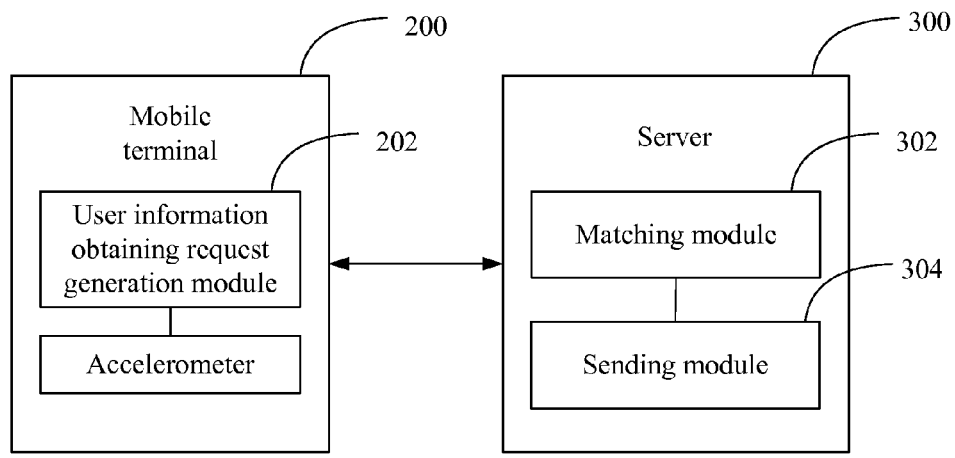
FIG. 5 shows a structural schematic diagram of a user information obtaining system according to an example of the present disclosure.

In an example, as shown in FIG. 5, a user information obtaining system, includes a mobile terminal 200 and a server 300, in which, the mobile terminal includes a user information obtaining request generation module 202 to generate a user information obtaining request and upload it to the server 300 when it detects the shaking operation.

In an example, the user information obtaining request generation module 202 can also be used to detect the shaking operation of the mobile terminal 200 by using an accelerometer.

Accelerometers are a device that detects acceleration and include angular accelerometers and linear accelerometers. The user information obtaining request is a request containing preset personal material of the user and a matching keyword preset by the user.

In an example, the user information obtaining request generation module 202 can be used to generate the user information obtaining request according to the detected shaking amplitude and/or the shaking frequency of the mobile terminal 200. In the present example, the user information obtaining request generation module 202 can be used to generate the user information obtaining request and upload it to the server when the accelerometer detects that the shaking amplitude and/or the shaking frequency of the mobile terminal 200 are/is larger than the predefined value.

Figure 6:
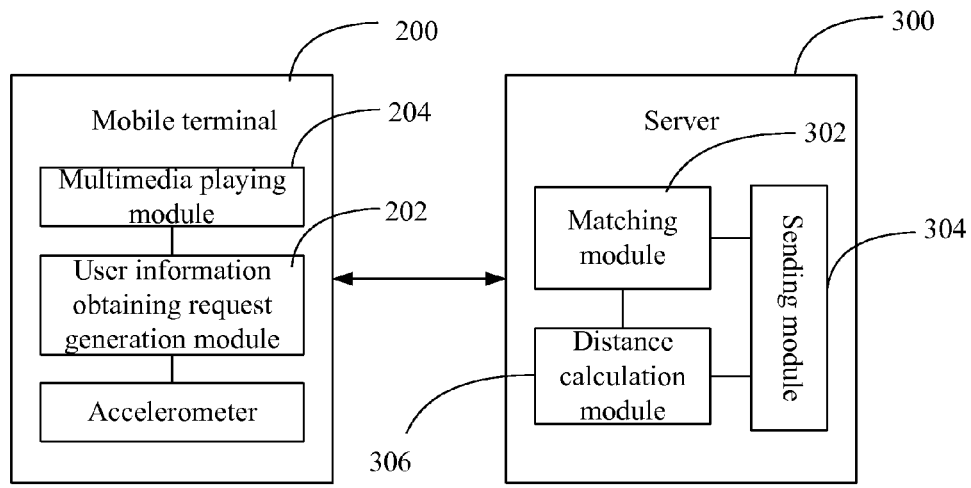
FIG. 6 shows a structural schematic diagram of a user information obtaining system according to another example of the present disclosure.

Further, as shown in FIG. 6, the mobile terminal 200 also includes a multimedia playing module 204 to play an animation and/or a sound according to the shaking operation. For example, the multimedia playing module 204 can be used to play the animation and/or the sound when the shaking amplitude and/or the shaking frequency are/is larger than the preset value.

Whether or not to play the animation and/or the sound is determined according to the shaking amplitude and/or the shaking frequency, and using the multimedia can visually prompt the user whether a current shaking operation triggers the user information obtaining request so as to facilitate the user to know whether the current shaking operation works or not.

The server 300 includes a matching module 302 and a sending module 304.

The matching module 302 is used to obtain a user who matches the user information obtaining request.

Preset personal information of a user can be stored in the mobile terminal 200, and the user information obtaining request generated by the user information obtaining request generation module 202 can contain the personal information. After the server 300 receives the user information obtaining request, the matching module 302 can extract the personal information from the user information obtaining request and obtain a matching user according to the personal information.

For example, the personal information of user A can include gender and a location. Then the matching module 302 can be used to obtain an opposite sex whose location is near to user A and the user information obtaining request time is the same with user A as the matching user.

The sending module 304 is used to send the information of the matching user to the mobile terminal 200.

In an example, the sending module 304 can be used to obtain the user information of the matching user and then send the user information of the matching user to the mobile terminal 200. The user information can be preset by the user, including at least one of name, avatar, gender, region, and personalized signature.

In another example, as shown in FIG. 3, the server 300 may also include a distance calculation module 306 to extract geographical location information in the matching request and calculate a distance between the mobile terminal and the matching user.

In the present example, the user information obtaining request generation module 202 is also used to obtain the geographical location information of the mobile terminal and generate the user information obtaining request according to the geographical location information and upload it. That is, the generated matching request contains the geographical location information submitted by the mobile terminal.

The distance calculation module 306 can be used to obtain the geographical location information by using a positioning service of the LBS (Location Based Service), and the distance calculation module 306 can be used to obtain its longitude and latitude information (geographical location information) via a GPS device. In another example, the distance calculation module 306 can be used to upload an identification of a base station or a broadband access point where the mobile terminal 200 locates to the LBS system and obtain its geographical location information via a feedback from the LBS system.

In the present example, the server 300 can first extract respective geographical location information from user information obtaining requests uploaded by multiple matching users, change it to longitude and latitude information, and then calculate the distances between the mobile terminal 200 and the matching users according to the longitude and latitude information. The calculated distances are physical distances between the mobile terminal 200 and the matching users, e.g., 1000 m, 200 km, etc.

In an example, the sending module 304 may also be used to send the distance between the mobile terminal 200 and the matching user to the mobile terminal 200.

Further, in an example, the matching module 302 is also used to obtain a user whose distance is smaller than or equal to the first threshold as the matching user. Then the sending module 304 can send the matching user whose distance is smaller than or equal to the first threshold to the mobile terminal 200.

In another example, the matching module 302 can also be used to obtain a user a time difference between whose request time and a request time submitted by the mobile terminal is smaller than or equal to a second threshold as the matching user.

For example, if the request time when the user information obtaining request uploaded by user A is received is 10:33:10 and the second threshold is 10 seconds, then the server obtains users corresponding to other user information obtaining requests whose request time is between 10:33:00 and 10:33:20 as the matching users. That is, other users who shake their mobile terminals when user A shakes his mobile terminal are obtained as the matching users.

In the present example, the mobile terminal 200 also includes a matching user showing module (not shown in the figure) to show the matching user after it receives the sent matching user. And when there are multiple matching users, the matching user showing module can be used to show the matching users in a list. Each matching user occupies a column of the list and an avatar of the matching user and a distance to the matching user can be shown in the column.

In the above instruction triggering method and apparatus, the input instruction is triggered by detecting the shaking operation of the mobile terminal, so that when a user uses the mobile terminal, he can complete the triggering of the input instruction by shaking the mobile terminal, which avoids looking for a specific key on the keyboard of the mobile terminal so as to improve the convenience of the user operation.

In the above user information obtaining method and system, the mobile terminal generates the user information obtaining request and uploads it by detecting the shaking operation; and after the server receives the user information obtaining request, it obtains a user that matches the user information obtaining request, and sends the user to the mobile terminal. Since as long as the shaking operation of the mobile terminal is detected, the matching user can be requested and it is not necessary for the user to input a keyword, the convenience of operation by the user is improved.

Furthermore, by adding geographical location information of the user terminal to the user information obtaining request, a matching user who is relatively near to the mobile terminal will be recommended directly, and the distance between the matching user and the mobile terminal can be sent to the mobile terminal to facilitate the user to select a matching user who is nearer to him, so as to further provide the convenience for the user.

In addition, by obtaining the request time submitted by the user terminal, the server can recommend users who perform shaking operations almost at the same time to each other, which, compared to a traditional fixed recommendation mode, can improve the flexibility and fun of the user recommendation.

Figure 7:
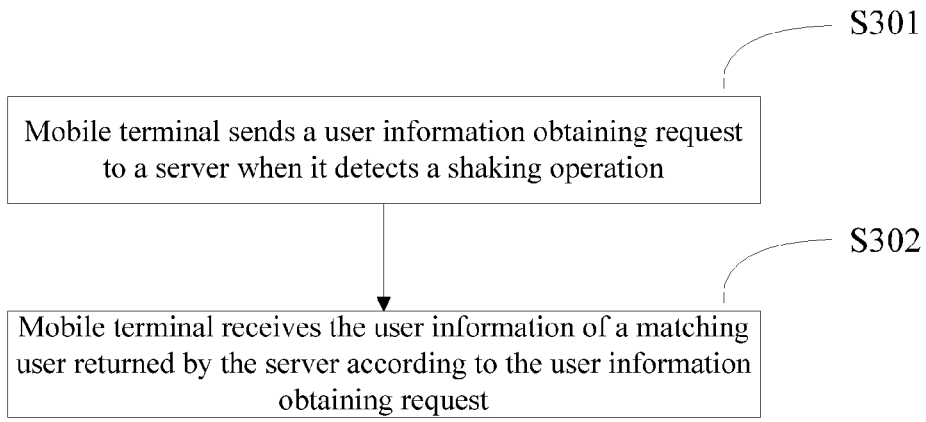
FIG. 7 shows a flow chart of a user information obtaining method according to another example.

In an example, as shown in FIG. 7, a user information obtaining method is provided. The user information obtaining method of an example of the present disclosure can be executed by the user information obtaining apparatus. The user information obtaining apparatus can be an instant messaging client; the user information obtaining method in the example of the present disclosure can also be executed by a terminal with a user information obtaining function, e.g., a terminal containing the user information obtaining apparatus. In the example of the present disclosure, the execution body of the user information obtaining method is explained by taking the user information obtaining apparatus as an example; however, specifically, the user information obtaining apparatus can be an instant messaging client installed on the terminal. The method mainly includes the following steps.

At block S301, when the mobile terminal detects a shaking operation, it sends a user information obtaining request to the server.

The mobile terminal can generate a user information obtaining request and sends it to a server according to a detected shaking amplitude and/or shaking frequency of the mobile terminal.

Preferably, the mobile terminal sending the user information obtaining request to the server when it detects the shaking operation, includes the following process.

When the mobile terminal detects a shaking instruction, it starts to count time, and when the counted time is up to a specified length, it determines whether the shaking instruction is continuously received during the counted time; and if the determination is yes, then the mobile terminal sends the user information obtaining request to the server.

Preferably, the user information obtaining request includes: a first user identification corresponding to the mobile terminal; or the first user identification corresponding to the mobile terminal and interest information of the first user; or the first user identification corresponding to the mobile terminal and the interest information of the first user, and a specified condition.

Preferably, the user information obtaining request also contains: request time and/or geographical location information submitted by the mobile terminal.

As block S302, the mobile terminal receives user information of a matching user returned by the server according to the user information obtaining request.

Figure 8:
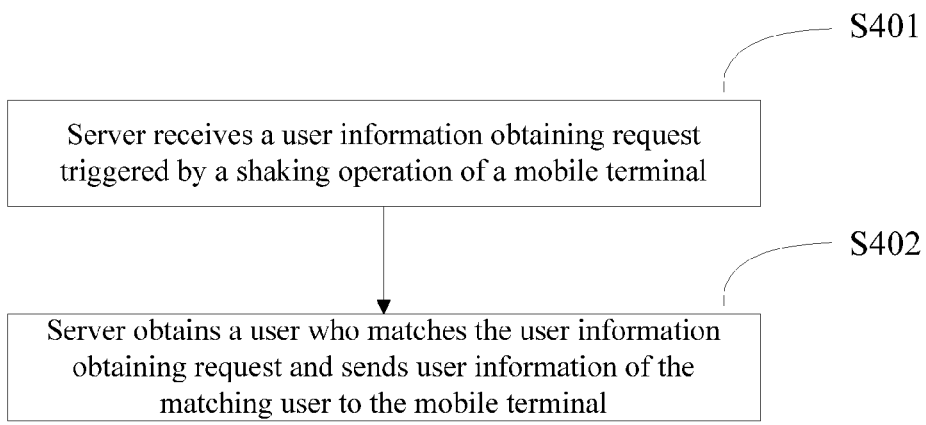
FIG. 8 shows a flow chart of a user information obtaining method according to another example.

In an example, as shown in FIG. 8, it is a user information obtaining method. The execution body of the user information obtaining method is a server, and specifically, the server can be an instant messaging server. And referring to FIG. 8, the method includes the following steps.

At block S401, the server receives a user information obtaining request triggered by a shaking operation of the mobile terminal.

The user information obtaining request includes: a first user identification corresponding to the mobile terminal which sends the request; or the first user identification corresponding to the mobile terminal which sends the request and interest information of the first user; or the first user identification corresponding to the mobile terminal which sends the request and interest information of the first user, and a specified condition.

At block S402, the server obtains a user who matches the user information obtaining request and sends the user information of the matching user to the mobile terminal.

Preferably, the above obtaining the user who matches the user information obtaining request includes: the server obtaining the interest information of the first user saved on the server according to the first user identification carried in the user information obtaining request, matching the interest information of the first user with interest information of multiple second users to determine a matching user; or the server matching the interest information of the first user and the interest information of the multiple second users to determine the matching user according to the first user identification and the interest information of the first user contained in the user information obtaining request.

Preferably, matching the interest information of the first user and the interest information of the multiple second users to determine the matching user includes: determining a matching object group from the multiple second users; and matching the interest information of the first user with interest information of each of the second users in the matching object group to determine the matching user.

The above determining the matching object group from the multiple second users includes:

obtaining a first specified group from the multiple second users according to first time, and taking the first specified group as the matching object group, the first time being time when the user information obtaining request of the terminal of the first user is received, and each of the second users in the first specified group is a user corresponding to a user information obtaining request received during a time period to which the first time belongs; or when the user information obtaining request carries the specified condition, obtaining a second specified group from the multiple second users and taking the second specified group as the matching object group and the user information of each of the second users in the second specified group all meets the specified condition.

Matching the interest information of the first user with the interest information of each of the second users in the matching object group to determine the matching user includes:

calculating a distance between a first vector and each of second vectors respectively to get multiple distances, taking reciprocals of the multiple distances as interest matching degrees between corresponding second users and the first user, obtaining a preset number of second users from the multiple second users according to an order of the interest matching degrees, and determining the preset number of the second users as the matching users, the first vector being a vector corresponding to the interest information of the first user and the second vector being a vector corresponding to the interest information of the second user; or clustering the first vector and each of the second vectors by using a clustering algorithm to determine a second user corresponding to the second vector which belongs to a same category with the first vector as the matching user.

It is to be noted that, the first user mentioned in the present example of the present disclosure refers to a user who currently sends a user information obtaining request to the server, while the multiple second users refer to users that have been saved to the server, and the server has saved the user identification and the interest information of each of the second users.

Preferably, the user information obtaining request contains: request time submitted by the mobile terminal.

Correspondingly, the obtaining the user who matches the user information obtaining request includes: the server obtaining a user a time difference between whose request time and the request time submitted by the mobile terminal is smaller than or equal to the second threshold as the matching user.

Preferably, the user information obtaining request includes: geographical location information submitted by the mobile terminal.

The method also includes: the server extracting the geographical location information contained in the user information obtaining request and calculating the distance between the mobile terminal and the matching user according to the geographical location information; and the server sending the distance between the mobile terminal and the matching user to the mobile terminal.

The obtaining the user who matches the user information obtaining request includes: the server obtaining a user whose distance is smaller than or equal to the first threshold as the matching user.

It should be understood that, the above user matching methods can be used in combination.

The method provided by the present example, by matching the interest information of the terminal and the interest information saved by the server to obtain a matching user and sending the user information of the matching user to the terminal, provides more targeted user information for the terminal user to make friends and provides a widely used experience of randomly making friends.

Figure 9:
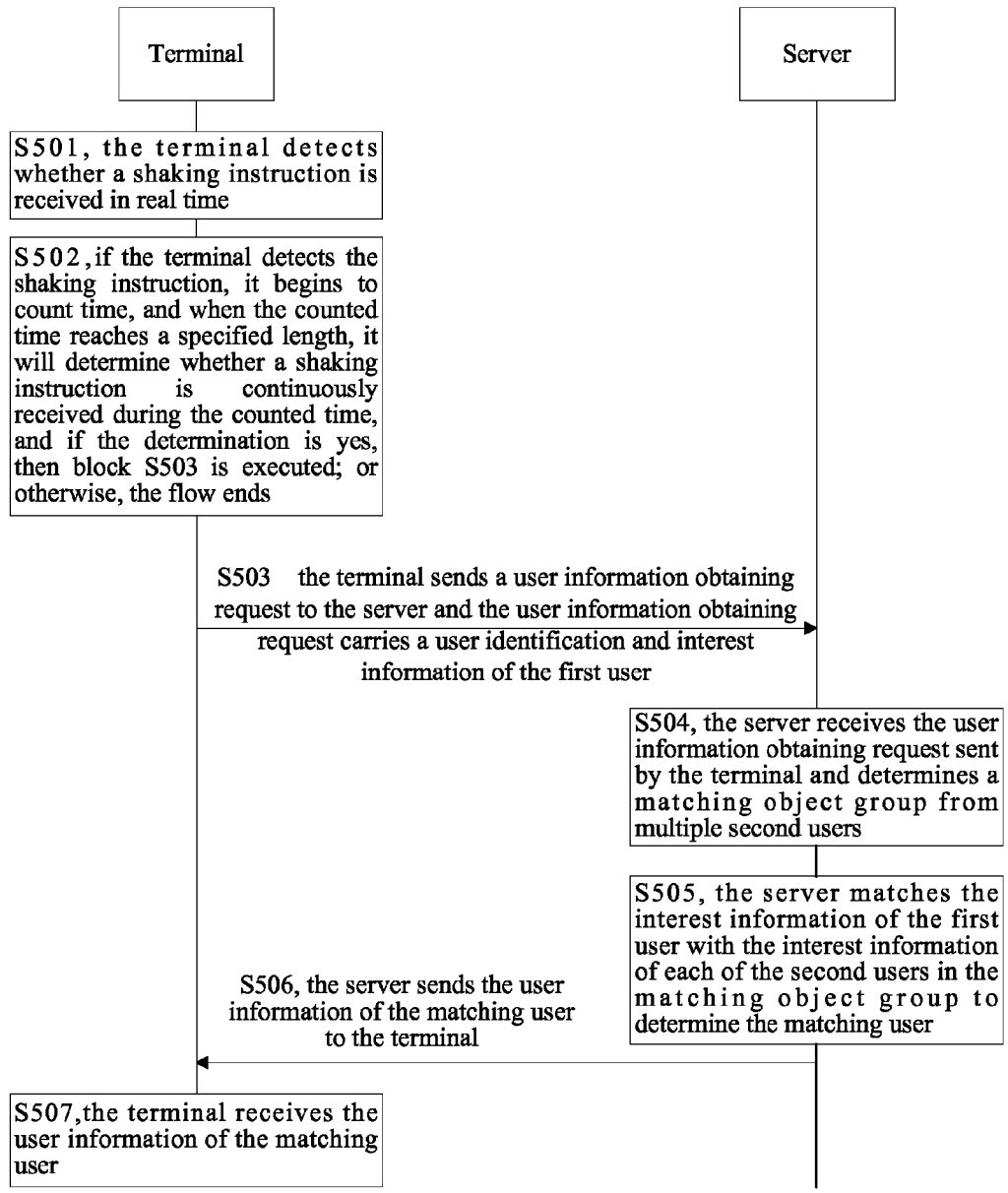
FIG. 9 shows a flow chart of a user information obtaining method according to another example.

FIG. 9 is a flow chart of a user information obtaining method provided by an example of the present disclosure. Interaction parties in the example are a server and a terminal. Specifically, the server can be an instant messaging server and the terminal can be a fixed terminal or a mobile terminal. The mobile terminal can be a smart phone, a tablet computer, a MP3 (moving picture experts group audio layer III), a PDA (personal digital assistant), etc. Preferably, the terminal is a terminal installed with an instant messaging application.

Referring to FIG. 9, the user information obtaining method includes the following steps.

At block S501, the terminal detects whether a shaking instruction is received in real time.

Specifically, there are many methods for the terminal to detect the shaking instruction from the user in real time. For example, this can be realized by using a sensor. An accelerometer is installed on the terminal to detect whether the user sends a shaking instruction according to acceleration generated by shaking the terminal collected in real time. The accelerometer is a 3-dimension accelerometer which detects acceleration of the terminal in an X direction, a Y direction, and a Z direction; or is a 2-dimension accelerometer which detects acceleration of the terminal in the X direction and the Y direction. The present example does not limit the accelerometer of the terminal. Specifically, take the 3-dimension accelerometer as an example. When the 3-dimension accelerometer detects that an acceleration value in any of the X direction, Y direction, or Z direction changes in real time, it will consider that it detects a shaking instruction sent by the user. Of course, there are other methods that can be used to detect the shaking instruction from the user in real time and the present example will not specify it herein.

At block S502, if the terminal detects the shaking instruction, it begins to count time, and when the counted time reaches a specified length, it will determine whether a shaking instruction is continuously received during the counted time, and if the determination is yes, then block S503 is executed; or otherwise, the flow ends.

The mobile terminal determines whether it receives the shaking instruction in the specified time length continuously, and if it does, then it considers that the user sends out a shaking instruction for obtaining the user information, and can make clear an intention of the user sending out the shaking instruction, and confirms that the shaking instruction is intended to send the user information obtaining request so as to obtain the user information from the server, which avoid a false operation caused by a shaking instruction unconsciously sent out by the user when he uses the terminal, the specified time length can be set in advance and saved in the terminal, e.g., being set to 5 s; or the user can change the setting according to his needs, for example, change it to 3 s, etc., and the present disclosure is not limited to this. Further, the terminal can preset that the shaking instruction is valid in a certain time period. For example, it is set to be valid in the day time or set to be valid during 9:00 AM to 12:00 AM, etc., and the present example is not intended to limit this.

At block S503, the terminal sends a user information obtaining request to the server and the user information obtaining request carries a user identification and interest information of the first user.

Preferably, the user information obtaining request carries the user identification and the interest information of the first user, so as to accordingly save the user identification and the interest information to the server to facilitate the subsequent obtaining process. A saving format is shown in the following table 1.

TABLE 1

| User Identification | Interest Information |
| --- | --- |

Further, when the server has saved the interest information of the first user, the user information obtaining request can also only carry the user identification of the first user. When the server receives a user information obtaining request that only carries the user identification of the first user, it can obtain the interest information of the first user from the server according to the user identification of the first user. The interest information saved on the server can be set by the first user on the server, or can be previously received interest information of the first user saved by the server.

The interest information can indicate one or more interests, and the interest information can carry multiple key words, numbers, or characters, etc. that are used to represent interests. The key words can be music, movie, reading, exercise, etc.; the numbers can be set by negotiation between the server and the terminal, each number or character indicating an interest, so that when the server obtains a number or a character in the interest information sent by the terminal, it can know a specified interest contained in the interest information of the terminal. The interest information can be obtained by way of the following: (1) the terminal provides an interface for the user to fill out interest information and saves the words inputted by the user as the interest information of the user; (2) the terminal provides interest information options for the user and saves interest information selected by the user as the interest information of the user; or (3) the terminal collects a habit of the user browsing web pages and obtains the interest information of the user by analyzing the habit of the user browsing the web pages. Specifically, the terminal detects web pages visited by a browser and makes analysis for the habit of the user browsing the web pages according to the number of visits to the web pages and the types of the web pages. When the number of visits to the first kind of web pages occupies a preset proportion of a total number of visits, or when the number of the browser visiting the first type of web pages reaches a preset number, a key word corresponding to the first type is taken as the interest information of the user. It is to be specified that, in the present example, types corresponding to web page links can be set by a technical personnel, and each type can correspond to at least one key word. For example, when the number of visits of the browser to shopping web pages reaches a preset number, the key word corresponding to the shopping web pages is "shopping", then "shopping" is the interest information of the user, and when the number of visits of the browser to music web pages reaches a third of the total number of visits of the browser to web pages, the key word corresponding to the music web pages is "music", then the "music" is the interest information of the user.

At block S504, the server receives the user information obtaining request sent by the terminal and determines a matching object group from multiple second users.

In the current example, the block S504 specifically includes: the server obtaining a first specified group from the multiple second users and taking the first specified group as a matching object group according to a first time. The first time is time when a user information obtaining request of the terminal of the first user is received and each of the second users in the first specified group is a user corresponding to a user information obtaining request received in a time period to which the first time belongs. The time period to which the first time belongs refers to a time period from a preset time length before the first time to the first time. For example, if the preset time length is 15 minutes, then the time period to which the first time belongs is 15 minutes before the first time to the first time. That is, the obtained each of the second users in the first specified group are users corresponding to the user information obtaining requests received in 15 minutes before the first time. In this way, obtaining the user information in real time is guaranteed so that users with user information obtaining requests in a same time period can find each other. Of course, in other examples, all the second users saved on the server can be used as members of the matching object group and are not limited to the time period, and a matching object can be provided for the terminal to the largest extent.

Preferably, the server saves user identifications and interest information carried in user information obtaining requests to a matching database, and each time when it receives a user identification and interest information, it matches the interest information with all interest information currently saved in the matching database to determine a matching user. Further, the life spans of the user identifications and the corresponding interest information saved in the matching database are all set to a preset time length, and when the life span of a user identification and corresponding interest information reaches the preset time length, the user identification and the corresponding interest information is deleted from the matching database.

Preferably, the server saves the user identifications and the interest information carried in the received user information obtaining requests in an array. The preset time length is the length of the array and it is also the time length during which each user identification and interest information are saved in the server. If the server receives a user information obtaining request at the first time, then after a preset time length is passed, user identification and the interest information carried in the user information obtaining request are deleted.

It is to be specified that, in the example of the present disclosure, the matching process is performed by the server, however, in another example, the matching process can be performed by another small or separated matching module, the matching module saving the received user identification and interest information and performing the matching process of the current example so as to determine a matching user. As is known by those ordinary skilled in the art, the server in the current example can be a separate server or can be a cluster of servers with different functions, which is not limited by the present disclosure.

At block S505, the server matches the interest information of the first user with the interest information of each of the second users in the matching object group to determine the matching user.

Preferably, as for the block S505, the server can preset N interest categories, 0 representing having no an interest and 1 representing having an interest, then the interest information of a user can be represented by using a vector containing 0 and 1, and a vector corresponding to the interest information can be determined according to the interest information of the user. That is to say, the interest information of user i can be denoted as:

$$\text{Interest}_i=(a_1,a_2,\ldots,a_N)$$

where, $a_i \in \{0,1\}$, $i \in \{1,N\}$, N is a natural number.

For example, 4 interest categories: music, movie, finance and current affairs are preset in the server.

While the interest information of the first user includes music and finance, then a vector corresponding to the interest information of the first user is $$\text{Interest}_1=(1,0,1,0).$$

In the present example, the block S505 specifically includes: calculating distances between the first vector and each of the second vectors to get multiple distances, taking reciprocals of the multiple distances as interest matching degrees between corresponding second users and the first user, obtaining a preset number of second users from the multiple second users according to an order of the interest matching degrees, and determining the preset number of second users as the matching users, the first vector being the vector corresponding to the interest information of the first user and a second vector being a vector corresponding to the interest information of a second user; preferably, the distances can be obtained by the Euclidean distance. For example, when $\text{Interest}_1=(\mathbf{1,0,1,0})$ and $\text{Interest}_2=(1,1,1,1)$, then the distance is the Euclidean distance between $\text{Interest}_1$ and $\text{Interest}_2$, $\sqrt{2}$, the interest matching degree between the first user and the second user is the reciprocal of the Euclidean distance, $\sqrt{2}/2$.

In another example, the block S505 specifically includes: clustering the first vector and each of the second vectors by using a clustering algorithm and determining a user which corresponds to a second vector that belongs to a same category with the first vector as the matching user. Preferably, the clustering algorithm can cluster users into multiple categories, and a second vector which belongs to a same category with the first vector will be deemed as a user having same interests with the first vector. There may be various clustering algorithms, and here only the K-means algorithm is used as an example to illustrate: 1) randomly selecting a preset number of vectors from the first vector and the multiple second vectors as mass centers; 2) measuring distances of each of the remaining second vectors to each of the mass centers and categorizing each of the remaining second vectors to a category to which its nearest mass center belongs; 3) recalculating the mass center of respective categories that have been got; and 4) iterating the steps 2) to 3) until a new mass center equals to an original mass center or the change of it is smaller than a specified threshold. When the algorithm ends, a category to which the first vector belongs and the second vectors that are contained in the category are obtained. Preferably, users in the category who correspond to a preset number of vectors that have a smallest distance to the first vector are determined as the matching users.

In another example, the user information obtaining request may not carry the interest information of the first user but carry the user identification of the first user, when the server receives the user information obtaining request carrying the user identification of the first user sent from the terminal, it will obtain interest information corresponding to the user identification saved by the server according to the user identification of the first user, and the interest information corresponding to the user identification is the interest information of the first user. It is to be noted that, in another example, before the first user sends the user information obtaining request, the interest information of the first user needs to be set in the server, or when the first user sends the user information obtaining request carrying the interest information to the server for the first time, the server saves the received interest information so as to subsequently use the saved interest information to perform matching when it receives the user information obtaining request carrying the user identification.

At block S506, the server sends the user information of the matching user to the terminal so that the terminal makes friends by using the user information of the matching user.

User information of all the users is saved on the server, and the user information can be indexed by user identifications. The user information may include a user identification, gender information, geographical location information, age information, etc., and the user information of the matching user may also include a user avatar of the matching user and/or default greetings. The user avatar and/or the default greetings can be obtained by the server according to the user identification of the matching user, and the default greetings can be default greetings at the server and can also be preset by the matching user.

At block S507, the terminal receives the user information of the matching user.

When the terminal receives the user information of the matching user, preferably, displays the user information of the matching user, specifically, when the user information of the matching user includes the user identification of the matching user, then displays the user identification, and when the user information also includes the user avatar of the matching user and/or the default greetings, when it displays the user identification, it displays the user avatar and/or the default greetings accordingly.

The way of displaying the user information can be set or adjusted by the terminal and the present example will not limit this.

Further, the terminal user can initiate a making friends request to the matching user according to the received user information, or greet the matching user or send instant messages to the matching user by using an instant messaging application provided by the terminal.

The terminal can save the received user information, or can save or delete it according to the selection of the terminal user for the terminal user to use in the subsequent process of making friends.

The method provided by the present example matches the interest information of the terminal user with the interest information saved by the server so as to get the matching users and send the user information of the matching users to the terminal, which provides more targeted user information for the terminal user and provides a widely used experience of randomly making friends. Further, by matching a user currently requests for the user information with multiple second users who are at a same time period with the user, the real-time property of obtaining the user information can be increased.

Figure 10:
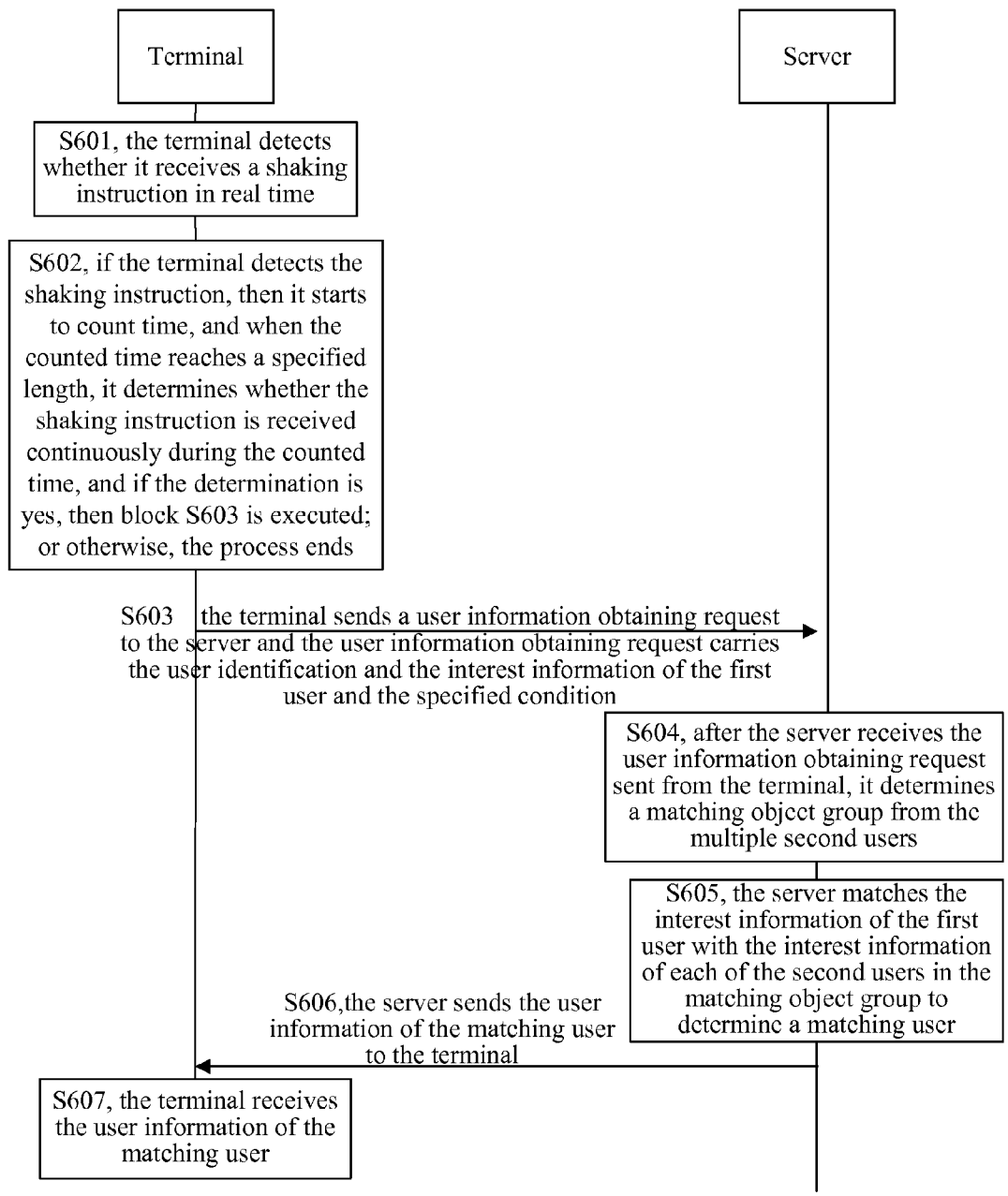
FIG. 10 shows a flow chart of a user information obtaining method according to another example.

FIG. 10 shows a flowchart of another user information obtaining method provided by an example of the present disclosure. In the present example, the user information obtaining request sent by the terminal also includes the specified condition. Referring to FIG. 10, the example specifically includes the following.

At block S601, the terminal detects whether it receives a shaking instruction in real time.

At block S602, if the terminal detects the shaking instruction, then it starts to count time, and when the counted time reaches a specified length, it determines whether the shaking instruction is received continuously during the counted time, and if the determination is yes, then block S603 is executed; or otherwise, the process ends.

The principles of blocks S601-S602 are the same with that of blocks S501-S502, and will not be elaborated herein.

At step S603, the terminal sends a user information obtaining request to the server and the user information obtaining request carries the user identification and the interest information of the first user and the specified condition.

The terminal can provide a setting window or setting options with the specified conditions to the terminal user, and the terminal user can set the specified conditions for the user information obtaining process of this time by using the setting window or the setting options according to his requirements for making friends. For example, the setting conditions can be gender, age, geographical location information, etc., which will not be enumerated here.

At block S604, after the server receives the user information obtaining request sent from the terminal, it determines a matching object group from the multiple second users.

When the user information obtaining request carries the specified conditions, the server will obtain a second specified group from the multiple second users according to the specified conditions and take the second specified group as the matching object group, the user information of each of the second users in the second specified group all meeting the specified conditions. When the server receives the specified conditions carried in the user information obtaining request, it will obtain a second specified group from the multiple second users saved on the server according to the specified conditions. For example, when a specified condition set by the terminal user is "female", the server obtains the second specified group from the multiple second users according to the specified condition, and the gender information in the user information of each of the second users in the second specified group is all female; further, when a specified condition set by the terminal user is "20 to 30 years old", then the server obtains a second specified group from the multiple second users, and the ages in the user information of each of the second users in the second specified group are all between 20-30 years old. As another example, when the specified condition set by the terminal user is "Beijing", then the server will obtain a second specified group from the multiple second users according to the specified condition and the geographical location information of each of the second users in the second specified group is all Beijing.

When the specified condition is geographical location information, the server uses LBS to obtain the geographical location information of the terminal and obtains a second user who is in a same geographical area or in a close geographical area with the first user according to the obtained geographical location information.

At block S605, the server matches the interest information of the first user with the interest information of each of the second users in the matching object group to determine a matching user.

At block S606, the server sends the user information of the matching user to the terminal so that the terminal can make friends according to the user information of the matching user.

At block S607, the terminal receives the user information of the matching user.

Blocks S605-S607 are similar to blocks S505-S507 and will not be elaborated herein.

The method provided by the present example provides more targeted user information for the terminal user to make friends and provides a widely used experience of randomly making friends by matching the interest information of the terminal user and the interest information saved by the server so as to obtain the matching user and send the user information of the matching user to the terminal. Further, the terminal user can reduce the scope of the matching users by setting a specified condition to determine a matching object group so as to precisely obtain user information that meets the requirements of making friends of the terminal user.

In the above examples, specifically, block S604 or S504 can be replaced by the following step: when the user information obtaining request carries the specified condition, the server obtaining a first specified group from the multiple second users according to the first time; in which the first time is time when the user information obtaining request of the terminal of the first user is received, and each of the second users in the first specified group is a user corresponding to a user information obtaining request that is received during the time period to which the first time belongs; the server obtaining a second specified group from the first specified group and taking the second specified group as a matching object group, in which the user information of each of the second users in the second specified group all meets the specified condition. By using the receiving time, the scope of the matching objects is reduced, and the scope of the matching objects is further reduced according to the specified condition, so that finally user information that is strongly targeted and closer to the requirements of the terminal user will be obtained.

Figure 11:
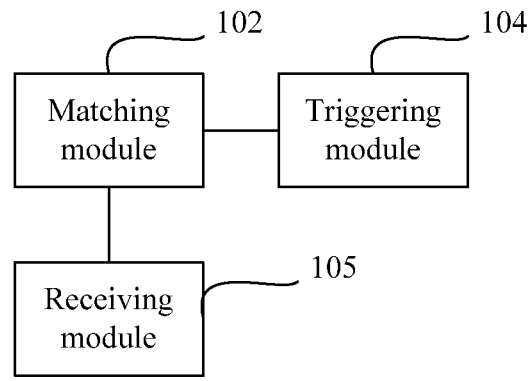
FIG. 11 shows a structural schematic diagram of a mobile terminal according to an example of the present disclosure.

FIG. 11 shows a structural schematic diagram of a mobile terminal provided by an example of the present disclosure, which includes: a detection module 102, to detect a shaking operation of the mobile terminal; a triggering module 104, when the detection module detects the shaking operation, to send a user information obtaining request to a server; and a receiving module 105, to receive user information of a matching user returned by the server according to the user information obtaining request.

Preferably, the detection module 102 is also adapted to notify the triggering module 104 to generate the user information obtaining request and send it to the server according to detected shaking amplitude and/or shaking frequency of the mobile terminal.

Preferably, the detection module 102 is also adapted to start to count time when it detects a shaking instruction, and when the counted time reaches a specified length, determine whether the shaking instruction is continuously received in the counted time; and if the determination is yes, then notify the triggering module 104 to generate the user information obtaining request and send it to the server. The function can be executed by an internal timing unit in the detection module 102.

Preferably, the user information obtaining request includes: a first user identification corresponding to the mobile terminal; or the first user identification corresponding to the mobile terminal and interest information of the first user; or the first user identification corresponding to the mobile terminal and the interest information of the first user, and a specified condition.

It is to be noted that when the terminal provided by the above example performs the user information obtaining service, it is only illustrated by using the above respective functional modules. However, in practical use, the above functions can be allocated to different functional modules to carry out as needed. That is to say, the internal structure of a device is divided into different functional modules to carry out the above described all or a part of functions. In addition, the terminal and the user information obtaining methods provided in the above examples belong to a same idea and for detailed implementation thereof please refer to the above method examples, which will not be elaborated herein.

Figure 12:
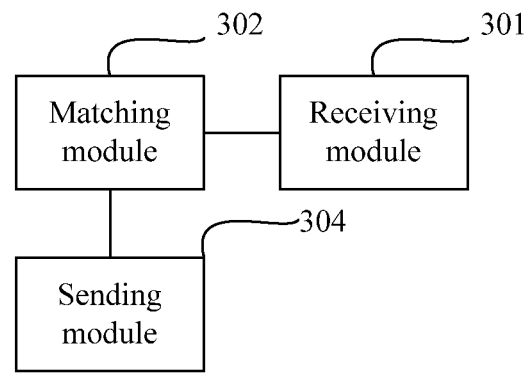
FIG. 12 shows a structural schematic diagram of a server in an example of the present disclosure.

FIG. 12 shows a structural schematic diagram of a server provided by an example of the present disclosure, which includes: a receiving module 301, to receive a user information obtaining request triggered by a shaking operation of a mobile terminal; a matching module 302, to obtain a user who matches the user information obtaining request; and a sending module 304, to send user information of the matching user to the mobile terminal.

The user information obtaining request includes: a first user identification corresponding to the mobile terminal that sends the request; or the first user identification corresponding to the mobile terminal and interest information of the first user; or the first user identification corresponding to the mobile terminal and the interest information of the first user, and a specified condition.

The matching module 302 is also adapted to:

obtain the interest information of the first user saved on the server according to the first user identification carried in the user information obtaining request, and match the interest information of the first user with interest information of multiple second users to determine a matching user; or match the interest information of the first user with interest information of the multiple second users to determine a matching user, according to the first user identification and the interest information of the first user carried in the user information obtaining request.

The matching module 302 includes:

a determination unit, to determine a matching object group from the multiple second users; and a matching unit, to match the interest information of the first user and the interest information of each of the second users in the matching object group to determine the matching user.

The determination unit is also adapted to:

obtain a first specified group from the multiple second users according to the first time and take the first specified group as the matching object group, the first time being the time when the user information obtaining request of the terminal of the first user is received, and each of second users in the first specified group is a user corresponding to a user information obtaining request received during a time period to which the first time belongs; or when the user information obtaining request carries the specified condition, obtain a second specified group from the multiple second users and take the second specified group as the matching object group, and the user information of each of the second users in the second specified group all meets the specified condition.

The matching unit is also adapted to:

respectively calculate a distance between a first vector and each second vector to get multiple distances, take reciprocals of the multiple distances as interest matching degrees between corresponding second users and the first user, obtain a preset number of second users from the multiple second users according to an order of the interest matching degrees, and determine the preset number of second users as the matching users, the first vector being a vector corresponding to the interest information of the first user and the second vector being a vector corresponding to the interest information of the second user; or cluster the first vector and each of the second vectors by using a clustering algorithm to determine a second user corresponding to the second vector which belongs to a same category with the first vector as the matching user.

The user information obtaining request contains: request time submitted by the mobile terminal.

The matching module 302 is also adapted to obtain a user a time difference between whose request time and the request time submitted by the mobile terminal is smaller than or equal to the second threshold as the matching user.

The user information obtaining request includes: geographical location information submitted by the mobile terminal.

The matching module 302 is also adapted to obtain a user whose distance is smaller than or equal to the first threshold as the matching user.

Another example of the present disclosure also provides a user information obtaining system including the mobile terminal and the server in the above examples. In the system, the functions and roles of the server and the mobile terminal are as those described in the examples before and will not be elaborated.

In summary, in the instruction triggering methods and apparatus of the examples of the present disclosure, the input instruction is triggered by detecting the shaking operation of the mobile terminal, so that when a user uses the mobile terminal, he can complete the triggering of the input instruction by shaking the mobile terminal, which avoids looking for a specific key on the keyboard of the mobile terminal so as to improve the convenience of the user operation.

In the above user information obtaining method and system, the mobile terminal generates the user information obtaining request and uploads it by detecting the shaking operation; and after the server receives the user information obtaining request, it obtains a user that matches the user information obtaining request, and sends the user to the mobile terminal. Since as long as the shaking operation of the mobile terminal is detected, the matching user can be requested and it is not necessary for the user to input a keyword, the convenience of operation by the user is improved.

And by matching the interest information of the terminal and the interest information saved by the server to obtain a matching user and sending the user information of the matching user to the terminal, more targeted user information for the terminal user to make friends and a widely used experience of randomly making friends are provided.

It should be understood by those ordinary skilled in the art that the above all or part of the flows in the method examples can be realized by computer programs instructing corresponding hardware and the programs can be stored in computer readable storage media, and when the programs are executed, the flows in the above method examples can be included. The storage media can be a magnetic disc, a disc, a Read-Only Memory or a Random Access Memory, etc.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. An instruction triggering method, comprising:
   detecting a shaking operation of a mobile terminal;
   starting to count time in response to determining that the mobile terminal detects the shaking operation, and in response to determining that counted time is up to a specified length, determining whether the shaking operation is continuously received during the counted time; and
   triggering a preset input instruction according to the detected shaking operation in response to determining that the shaking operation is continuously received during the counted time.

2. The instruction triggering method according to claim 1, wherein detecting the shaking operation of the mobile terminal comprises:
   detecting the shaking operation of the mobile terminal by using an accelerometer.

3. The instruction triggering method according to claim 1, wherein triggering the preset input instruction according to the detected shaking operation comprises:
   triggering the preset input instruction according to detected shaking amplitude and/or shaking frequency of the mobile terminal.

4. The instruction triggering method according to claim 1, wherein after the step of triggering the preset input instruction according to the detected shaking operation, the method further comprises:
   playing an animation and/or a sound according to the shaking operation.

5. The instruction triggering method according to claim 1, wherein the preset input instruction is a screen unlocking instruction; and
   after the step of triggering the preset input instruction according to the detected shaking operation, the method further comprises:
   unlocking a display screen of the mobile terminal according to the preset input instruction.

6. The instruction triggering method according to claim 1, wherein the preset input instruction is an incoming call answer/termination instruction; and
after the step of triggering the preset input instruction according to the detected shaking operation, the method further comprises:
answering or terminating an incoming call according to the preset input instruction.

7. The instruction triggering method according to claim 1, wherein the preset input instruction is a data sending instruction; and
after the step of triggering the preset input instruction according to the detected shaking operation, the method further comprises:
sending data to a server according to the preset input instruction.

8. A user information obtaining method, comprising:
sending a user information obtaining request to a server by a mobile terminal in response to determining that the mobile terminal detects a shaking operation; and,
receiving user information of a matching user returned from the server according to the user information obtaining request by the mobile terminal,
wherein sending the user information obtaining request to the server by the mobile terminal in response to determining that the mobile terminal detects the shaking operation comprises:
starting to count time in response to determining that the mobile terminal detects the shaking operation, and in response to determining that counted time is up to a specified length, determining whether the shaking operation is continuously received during the counted time; and
sending the user information obtaining request to the server by the mobile terminal in response to determining that the shaking operation is continuously received during the counted time.

9. The user information obtaining method according to claim 8, wherein sending the user information obtaining request to the server by the mobile terminal in response to determining that the mobile terminal detects the shaking operation comprises:
generating the user information obtaining request and sending the user information obtaining request to the server by the mobile terminal according to detected shaking amplitude and/or shaking frequency of the mobile terminal.

10. The user information obtaining method according to claim 8, wherein the user information obtaining request comprises: a first user identification corresponding to the mobile terminal.

11. The user information obtaining method according to claim 10, wherein the user information obtaining request further comprises:
interest information of a first user corresponding to the mobile terminal, or
the interest information of the first user corresponding to the mobile terminal and a specified condition.

12. The user information obtaining method according to claim 10, wherein the user information obtaining request further comprises: request time submitted by the mobile terminal.

13. The user information obtaining method according to claim 10, wherein the user information obtaining request further comprises: geographical location information submitted by the mobile terminal.

14. A user information obtaining method, comprising:
receiving a user information obtaining request triggered by a shaking operation of a mobile terminal; and
obtaining a matching user who matches the user information obtaining request and sending user information of the matching user to the mobile terminal;
wherein the user information obtaining request comprises: request time submitted by the mobile terminal;
and obtaining the matching user who matches the user information obtaining request comprises:
obtaining a user a time difference between whose request time and the request time submitted by the mobile terminal is smaller than or equal to a second threshold as the matching user by the server.

15. The user information obtaining method according to claim 14, wherein the user information obtaining request comprises:
a first user identification corresponding to the mobile terminal which sends the user information obtaining request; or
the first user identification corresponding to the mobile terminal which sends the user information obtaining request and interest information of a first user; or
the first user identification corresponding to the mobile terminal which sends the user information obtaining request and interest information of the first user, and a specified condition.

16. The user information obtaining method according to claim 15, wherein obtaining the matching user who matches the user information obtaining request comprises:
obtaining the interest information of the first user saved on the server according to the first user identification carried in the user information obtaining request, and matching the interest information of the first user with interest information of multiple second users to determine a matching user by the server; or
matching the interest information of the first user with the interest information of the multiple second users to determine the matching user according to the first user identification and the interest information of the first user carried in the user information obtaining request by the server.

17. The user information obtaining method according to claim 16, wherein matching the interest information of the first user with the interest information of the multiple second users to determine the matching user comprises:
determining a matching object group from the multiple second users; and
matching the interest information of the first user with interest information of each of second users in the matching object group to determine the matching user.

18. The user information obtaining method according to claim 17, wherein determining the matching object group from the multiple second users comprises:
obtaining a first specified group from the multiple second users according to first time, and taking the first specified group as the matching object group, the first time being time when the user information obtaining request of the terminal of the first user is received, and each of second users in the first specified group is a user corresponding to a user information obtaining request received during a time period to which the first time belongs; or
in response to determining that the user information obtaining request carries the specified condition, obtaining a second specified group from the multiple second users and taking the second specified group as the matching object group, user information of each of second users in the second specified group all meeting the specified condition.

19. The user information obtaining method according to claim 17, wherein matching the interest information of the first user with the interest information of each of the second users in the matching object group to determine the matching user comprises:

calculating a distance between a first vector and each of second vectors respectively to get multiple distances, taking reciprocals of the multiple distances as interest matching degrees between corresponding second users and the first user, obtaining a preset number of second users from the multiple second users according to an order of interest matching degrees, and determining the preset number of the second users as the matching user, wherein the first vector is a vector corresponding to the interest information of the first user and a second vector is a vector corresponding to interest information of a second user; or clustering the first vector and each of the second vectors by using a clustering algorithm and determining a second user corresponding to a second vector which belongs to a same category with the first vector as the matching user.

20. The user information obtaining method according to claim 14, wherein the user information obtaining request further comprises:

geographical location information submitted by the mobile terminal; and the method further comprises: extracting the geographical location information contained in the user information obtaining request and calculating the distance between the mobile terminal and the matching user according to the geographical location information by the server; and sending the distance between the mobile terminal and the matching user to the mobile terminal by the server.

21. The user information obtaining method according to claim 20, wherein obtaining the matching user who matches the user information obtaining request comprises:

obtaining a user whose distance is smaller than or equal to a first threshold as the matching user by the server.

22. A user information obtaining system, comprising a mobile terminal and a server, wherein the mobile terminal comprises:

a detection module, to detect a shaking operation of the mobile terminal;

a triggering module, in response to determining that the detection module detects the shaking operation, to send a user information obtaining request to a server; and a receiving module, to receive user information of a matching user returned according to the user information obtaining request by the server;

and wherein the server comprises:

a receiving module, to receive a user information obtaining request triggered by a shaking operation of a mobile terminal;

a matching module, to obtain a user who matches the user information obtaining request; and a sending module, to send user information of the matching user to the mobile terminal;

wherein the detection module is further to start to count time in response to determining that the shaking operation is detected, and in response to determining that counted time is up to a specified length, determine whether the shaking operation is continuously received during the counted time; and the triggering module is to send the user information obtaining request to the server in response to determining that the shaking operation is continuously received during the counted time.

* * * * *